United States Patent [19]

Anderson

[11] 4,424,014
[45] Jan. 3, 1984

[54] POWER STEERING PUMP DRIVE SHAFT SEAL AREA DRAIN STRUCTURE

[75] Inventor: Stanley E. Anderson, Saginaw, Mich.

[73] Assignee: General Motors Corporation, Detroit, Mich.

[21] Appl. No.: 271,660

[22] Filed: Jun. 8, 1981

[51] Int. Cl.³ .......................... F04C 2/00; F04C 15/00
[52] U.S. Cl. ...................................... 418/104; 418/133
[58] Field of Search ....................... 418/102, 133, 104; 417/79, 300

[56] References Cited

U.S. PATENT DOCUMENTS

| | | | |
|---|---|---|---|
| 2,766,700 | 10/1956 | Klessig | 418/133 |
| 2,996,013 | 8/1961 | Thompson et al. | 417/300 |
| 3,272,138 | 9/1966 | Connoy et al. | 418/102 |
| 3,645,647 | 2/1972 | Ciampa et al. | 417/79 |
| 4,203,287 | 5/1980 | Bennett | 60/329 |

FOREIGN PATENT DOCUMENTS

| | | | |
|---|---|---|---|
| 962131 | 2/1975 | Canada | 418/133 |
| 2855985 | 7/1980 | Fed. Rep. of Germany | 418/102 |
| 875950 | 8/1961 | United Kingdom | 418/102 |

*Primary Examiner*—John J. Vrablik
*Attorney, Agent, or Firm*—Donald F. Scherer

[57] ABSTRACT

A remote reservoir power steering type pump has a shaft seal which prevents shaft bearing lube flow from leaking to atmosphere. The lube flow is derived from internal pump leakage along the shaft. This fluid must be returned to the main system fluid. In remote reservoir type pumps, the pressure inside the pump housing is greater than atmospheric pressure due to the supercharge gained through aspiration. The shaft seal area is maintained at substantially atmospheric pressure by bleeding or draining this area to the supply port which is not subjected to the supercharge pressure thereby maintaining the seal area at the lower pressure.

2 Claims, 1 Drawing Figure

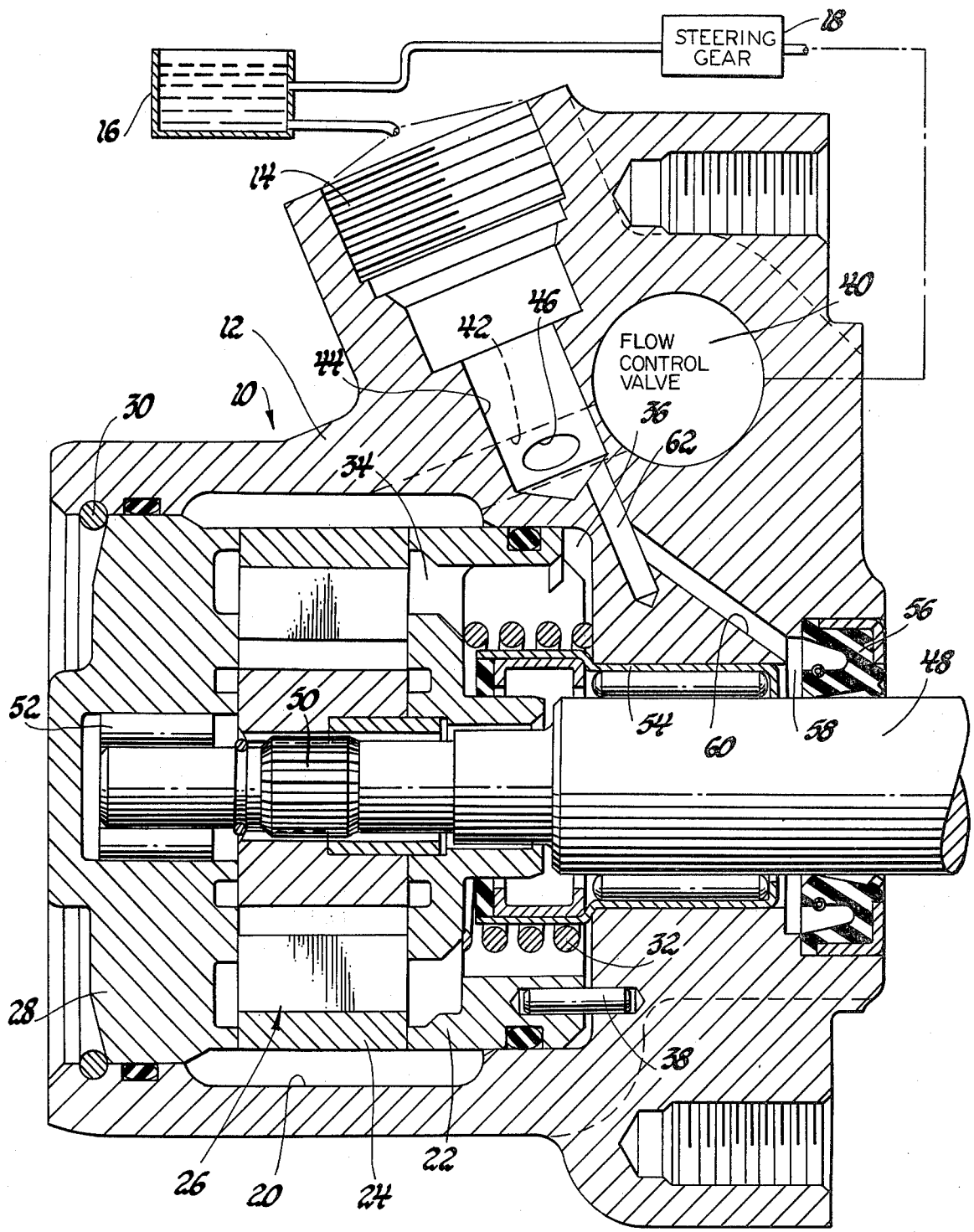

POWER STEERING PUMP DRIVE SHAFT SEAL AREA DRAIN STRUCTURE

This invention relates to pump shaft seal bleed structures and more particularly to such pumps having a supercharge pressure present wherein the oil pressure at the shaft seal is maintained at less than supercharge pressure.

The majority of prior art automotive power steering pumps, such as that shown in U.S. Pat. No. 3,207,077 issued to Zeigler et al. Sept. 21, 1965, have an attached reservoir which permits the storage of hydraulic fluid immediately surrounding the pump housing. In this type of integral reservoir, it is a simple matter to maintain the shaft lubrication flow at the low pressure level present in a reservoir and significantly less than the supercharge pressure found within the pump housing. However, as automobiles become smaller, the available space adjacent the engine becomes more crowded such that power accessories like power steering pumps must use less space immediately adjacent the engine. It therefore becomes advantageous to utilize a remote reservoir type power steering pump wherein the pump is mounted directly on the engine while the reservoir is disposed at a convenient location and communicated to the pump by a hydraulic line. Such a remote reservoir installation is shown in U.S. Pat. No. 4,203,287 issued to Bennett May 20, 1980.

When a remote reservoir type pump is utilized, the pump shaft seal cannot be conveniently connected to the reservoir. The result of this is that the shaft seal is drained to the interior of the pump housing which is generally at a supercharge pressure significantly greater than atmospheric pressure. The supercharge pressure in some operating conditions can exceed 30 psi, while during cold start the internal pressure can be less than atmospheric.

In these remote reservoir pumps, the shaft seal must be capable of maintaining seal integrity throughout this pressure range. This means that the lip pressure or shaft pressure must be increased to prevent fluid leakage past the seal face. While seals capable of maintaining the seal integrity throughout this pressure range are well within the state of the art, the increased sealing pressures do create frictional losses which are undesirable and also require the use of a seal which is economically disadvantageous.

The present invention provides a remote reservoir pump structure wherein the shaft seal area is drained directly to the fluid supply port for the pump. The fluid pressure in the supply port is substantially equal to the reservoir pressures and therefore significantly below the supercharge pressure. This is accomplished by extending the supply port to a position where it is laterally offset from the flow control valve utilized with the pump. The supply port is at a location which permits a drill passage extending from the shaft seal area to intersect the supply port at a location displaced from the pump cavity within the pump housing.

It is therefore an object of this invention to provide an improved remote reservoir type power steering pump having a pump cavity which is subjected to either pump discharge pressure or pump inlet supercharge pressure and including a supply port connected to a remote reservoir wherein the pump shaft has an adjacent sealing structure which prevents bearing lube flow from being lost and wherein the bearing lube flow is communicated directly to the supply port which is maintained at a pressure level significantly below the above-mentioned pump pressure levels.

This and other objects and advantages of the present invention will be more apparent from the following description and drawing which is a cross-sectional elevational view of a power steering pump and a diagrammatic representation of other power steering components.

Referring to the drawing, there is seen a power steering pump, generally designated 10, and including a housing 12, having formed therein a supply port 14 which is in fluid communication with a remotely disposed reservoir 16. The reservoir 16 is in fluid communication with a conventional power-assisted steering gear 18 which receives operating fluid under pressure from the power steering pump 10.

The housing 12 has an internal cavity 20 which is generally of cylindrical shape and encloses the pump operating parts comprised of a pressure plate 22, a cam ring 24, a rotor and vane assembly 26 and a thrust plate 28. These pump components 22 through 28 are well-known in the power steering pump art. In particular, the cam ring 24 and rotor and vane assembly 26 are substantially the same as that shown in the above-mentioned Zeigler et al. patent.

The thrust plate 28 is limited in its leftward movement by a locking ring 30, while the pressure plate 22 is urged leftward by a compression spring 32. Through the cooperation of the locking ring 30 and the spring 32, the internal pump components 22 through 28 are maintained in operating relationship when the system pressure is at a low level.

The discharge flow from the rotor and vane assembly passes through a pair of ports 34 formed in the pressure plate 22 to a space 36 formed between the bottom of cavity 20 and the pressure plate 22. Since this space 36 is subjected to pump discharge pressure, a hydraulic force to the left is created which assists the spring 32 in maintaining the pump components in proper orientation. The pressure plate 22, cam ring 24 and thrust plate 28 are maintained in axial alignment by a pair of dowel pins, not shown, and the pressure plate 22 is prevented from rotating within the cavity 20 by a dowel pin 38.

The space 36 is in fluid communication with a conventional flow control valve 40 which is operative to deliver a predetermined amount of flow to the steering gear 18 in a well-known manner. The excess flow is returned via a passage 42 to the internal cavity of the pump from which it is admitted to the pump through inlet ports as is well-known. The passage 42 intersects a passage 44 to create an opening 46. The passage 44 is an extension of the supply port 14 such that fluid from reservoir 16 can be communicated from passage 42 through opening 46.

Due to the velocity of the fluid in passage 42, an aspirating effect is present which draws fluid from the reservoir 16 in such a manner as to create a supercharged or elevated pressure within a pump housing 12. This aspirating effect is a well-known phenomenon which has been utilized in power steering pumps for many years.

The rotor portion of the rotor and vane assembly 26 is drivingly connected to a shaft 48 through a spline connection 50. The shaft 48 is rotatably supported in the thrust plate 28 by a roller bearing assembly 52 and in the housing 12 by a roller bearing and seal assembly 54. The drive shaft extends through the housing 12 and is sealingly engaged by a seal assembly 56 which prevents air from entering the pump and prevents fluid leakage.

The bearing assemblies 52 and 54 require lubrication fluid. This fluid is derived from internal pump leakage which passes between the rotor and the thrust plate 28 or pressure plate 22. This fluid leakage flows along the shaft 48 to a space 58 adjacent the seal 56. It is in the space 58 that the shaft lubrication flow is communicated. The space 58 is in communication with a fluid passage 60 which intersects a fluid passage 62, which in turn is in communication with fluid passage 44. Thus, the shaft lubrication fluid, and therefore the internal side of seal 56 is in fluid communication with passage 44 such that the fluid pressure contained therein is substantially equal to the fluid pressure found in reservoir 16.

In prior remote reservoir pumps, it has been the practice to communicate the seal area directly with the internal chamber of the pump housing such that the shaft seal is subjected to supercharge pressure which results in higher sealing forces, lip drag on the shaft, and lip wear. With the present invention, it can be seen that the fluid pressure in cavity 58 is substantially equal to the pressure in reservoir 16 such that the seal 56 is not subjected to significantly high pressures and substantially lighter sealing forces are permissible with a more resilient seal design and material.

The embodiments of the invention in which an exclusive property or privilege is claimed are defined as follows:

1. A power steering pump for use with a remote reservoir system, said pump comprising; a pump housing; vane type pump means disposed in said pump housing; drive shaft means for driving said vane type pump means; seal means disposed in a cavity in the pump housing for preventing leakage from along said shaft to atmosphere; the interior of said housing being subjected to either pump discharge pressure or pump inlet supercharged pressure; supply port means for communicating fluid as necessary from the remote reservoir to said housing with the fluid in said supply port means being at a pressure less than either interior pressures; passage means communicating said cavity on the pump side of the seal means with said supply port means for maintaining the pressure adjacent said seal means at a pressure level substantially equal to the pressure at said supply port means by enabling leakage along the shaft to communicate directly with the supply.

2. A power steering pump for use with a remote reservoir system, said pump comprising; a pump housing having a cylindrical cavity with a closed end; vane type pump means disposed in said cylindrical cavity; drive shaft means for driving said vane type pump means; seal means disposed in a lube cavity in the pump housing for preventng leakage from along said shaft to atmosphere; the cylindrical cavity of said housing being subjected to either pump discharge pressure or pump inlet supercharged pressure; supply port means for communicating fluid as necessary from the remote reservoir to said housing with the fluid in said supply port means being at a pressure less than either interior pressures including a passage extending oblique to and not intersecting with the cylindrical cavity; drain passage means communicating said lube cavity on the pump side of the seal means with said passage of said supply port means for maintaining the pressure adjacent said seal means at a pressure level substantially equal to the pressure at said supply port means by enabling leakage along the shaft to communicate directly with the supply.

* * * * *